United States Patent
Jiang

(10) Patent No.: US 8,453,208 B2
(45) Date of Patent: May 28, 2013

(54) NETWORK AUTHENTICATION METHOD, METHOD FOR CLIENT TO REQUEST AUTHENTICATION, CLIENT, AND DEVICE

(75) Inventor: Wu Jiang, Beijing (CN)

(73) Assignee: Chengdu Huawei Symantec Technologies Co., Ltd., Chengdu (CN)

( * ) Notice: Subject to any disclaimer, the term of this patent is extended or adjusted under 35 U.S.C. 154(b) by 120 days.

(21) Appl. No.: 13/095,413

(22) Filed: Apr. 27, 2011

(65) Prior Publication Data
US 2011/0202972 A1 Aug. 18, 2011

Related U.S. Application Data

(63) Continuation of application No. PCT/CN2009/073885, filed on Sep. 11, 2009.

(30) Foreign Application Priority Data

Oct. 27, 2008 (CN) .......................... 2008 1 0217107

(51) Int. Cl.
H04L 29/06 (2006.01)
(52) U.S. Cl.
USPC ................ 726/3; 726/25; 713/150; 713/153; 713/154; 709/229
(58) Field of Classification Search
USPC .......................................................... 726/3
See application file for complete search history.

(56) References Cited

U.S. PATENT DOCUMENTS

| | | | |
|---|---|---|---|
| 5,606,242 A | 2/1997 | Hull et al. | |
| 6,823,387 B1 | 11/2004 | Srinivas | |
| 7,979,694 B2 * | 7/2011 | Touitou et al. | 713/154 |
| 2006/0230129 A1 | 10/2006 | Swami et al. | |

FOREIGN PATENT DOCUMENTS

| | | |
|---|---|---|
| CN | 1735045 A | 2/2006 |
| CN | 1938982 A | 3/2007 |

(Continued)

OTHER PUBLICATIONS

Gupta, B. B., R. C. Joshi, and Manoj Misra. "Distributed Denial of Service Prevention Techniques." International Journal of Computer and Electrical Engineering, vol. 2, No. 2 (Apr. 2010): 1793-8163.*

(Continued)

Primary Examiner — Taghi Arani
Assistant Examiner — Narciso Victoria
(74) Attorney, Agent, or Firm — Leydig, Voit & Mayer, Ltd.

(57) ABSTRACT

A network authentication method, a method for a client to request authentication, a client, and a device are provided. The method includes: receiving synchronize (SYN) data sent by a client, where the SYN data includes a sequence number SEQ1 and a network parameter; sending synchronize acknowledge (SYN_ACK) data to the client in response to the SYN data, where the SYN_ACK data includes an acknowledgment number ACK2, and the value of ACK2 is a value obtained by carrying out a function transformation according to the network parameter of the SYN data; receiving RESET (RST) data sent by the client in response to the SYN_ACK data, where the RST data includes a sequence number SEQ3 or an acknowledgment number ACK3, and the value of SEQ3 or ACK3 is the same as that of ACK2, and the RST data further includes a network parameter the same as that of the SYN data; carrying out the function transformation according to the network parameter of the RST data to obtain a check value CHK; and passing the authentication of the client if CHK matches SEQ3 or ACK3. Therefore, the occupation of storage resources is reduced.

7 Claims, 3 Drawing Sheets

FOREIGN PATENT DOCUMENTS

| | | |
|---|---|---|
| CN | 101147376 A | 3/2008 |
| CN | 101184204 A | 5/2008 |
| EP | 1898586 A1 | 3/2008 |
| EP | 1971096 A2 | 9/2008 |
| WO | 98/34384 A1 | 8/1998 |
| WO | 2004/046835 A2 | 6/2004 |
| WO | 2006/082507 A1 | 8/2006 |

OTHER PUBLICATIONS

International Search Report in corresponding PCT Application No. PCT/CN2009/073885 (Dec. 24, 2009).

Written Opinion of the International Searching Authority in corresponding PCT Application No. PCT/CN2009/073885 (Dec. 24, 2009).

Extended European Search Report in corresponding European Application No. 09823030.3 (Feb. 6, 2012).

Ren et al., "Design and Realization of Software for guard Against DDoS Based on Self-Similar and Optimization Filter," The Journal of China Universities of Posts and Telecommunications, vol. 13, No. 1, Mar. 2006, Jiangsu Province, China.

$2^{nd}$ Office Action in corresponding Chinese Patent Application No. 200810217107.6 (Oct. 10, 2012).

* cited by examiner

NETWORK AUTHENTICATION METHOD, METHOD FOR CLIENT TO REQUEST AUTHENTICATION, CLIENT, AND DEVICE

CROSS-REFERENCE TO RELATED APPLICATIONS

This application is a continuation of International Application PCT/CN2009/073885, filed on Sep. 11, 2009, which claims priority to Chinese Patent Application No. 200810217107.6, filed on Oct. 27, 2008, both of which are hereby incorporated by reference in their entireties.

FIELD OF THE INVENTION

The present invention relates to the field of network security technologies, and in particular, to a network authentication method, a method for a client to request authentication, a client, and a device.

BACKGROUND OF THE INVENTION

A large number of Distributed Denial of Service (DDoS) attacks, commonly referred to as flood attacks, appear on the network, where an attacked host or server has a large number of waiting Transmission Control Protocol (TCP) connections, and the network is filled with a large number of useless data packets. The attacker manufactures high-flow useless data and takes advantage of defects of service or transmission protocols provided by the victim host to repeatedly send a particular service request at a high speed, so that the victim host cannot promptly process all normal requests, thereby causing network congestion, and even worse, causing system breakdown. A Synchronize Sequence Number Flood (SYN Flood) is one of the major attack methods of the DDoS. The SYN Flood uses the intrinsic vulnerability of the TCP/Internet Protocol (IP), and connection-oriented TCP three-way handshakes are the basis for the existence of the SYN Flood. If a user gets into a sudden breakdown or off-line after sending a SYN message to the server, the server, after sending a Synchronize Sequence Number acknowledge (SYN_ACK) data packet, cannot receive an ACK data packet from a client (the third handshake cannot be completed). Under the circumstances, the server usually retries (resends the SYN_ACK data packet to the client) and waits for a period of time before discarding the uncompleted connection, where this period of time is referred to as a SYN timeout, and is generally in the level of minutes (about thirty seconds to two minutes). It is not a big problem that abnormality of one user causes one thread of the server to wait for one minute. However, if a malicious attacker simulates the situation on a large scale, it consumes the server a large amount of resources to maintain a large list of semi-connections. It consumes a large amount of Central Processing Unit (CPU) time and memory even if a simple storage and traverse is done, let alone continuous SYN_ACK retry on the IP addresses in the list. Actually, if the TCP/IP stack of the server is not strong enough, the final result is always a stack overflow or crash. Even if the system of the server is strong enough, the server is busy with the processing of fake TCP connection requests made by the attacker and has no time to pay attention to normal requests made by the client (after all, the ratio of the normal requests from the client is very low). At this time, as seen from the point of view of the normal client, the server becomes unresponsive. The situation is referred to as that the server is under a SYN Flood attack.

In a known authentication method for preventing a DDoS attack, a gateway is employed to protect authentication. After receiving a SYN data packet, the gateway equipment sends a SYN_ACK data packet to the client, where a sequence number (SEQ) in the SYN_ACK data packet is constructed by the gateway according to information such as an IP address of the client. After receiving the SYN_ACK data packet, the client responds with an ACK data packet, where an acknowledgment SEQ of the ACK data packet is the SEQ of the SYN_ACK data packet plus one. When receiving the ACK data packet, the gateway records the source IP address of the client in a white list, and sends a RESET (RST) data packet to the client. The connection is released after the client receives the RST data packet. When the client resends the SYN data packet to request a connection within a certain time, the client can directly access the protected server within the aging time of the white list. Although Prior Art 1 can protect the server to some extent, the protective equipment has to send the return packet twice, which is a waste of resources.

In a known method for reducing flood attacks through a firewall, after receiving a SYN data packet, which is sent by a client and includes an SEQ, the firewall sends a SYN_ACK data packet to the client, where the SYN_ACK data packet includes an SEQ value and an ACK SEQUENCE (ACK) value, and the ACK of the SYN_ACK data packet is not equal to the SEQ of the SYN data packet plus one. After receiving the SYN_ACK data packet including the wrong ACK, the client sends an RST data packet to the firewall according to the requirements of the TCP/IP protocol. Under normal circumstances, the SEQ of the RST data packet is consistent with the ACK of the SYN_ACK data packet. The firewall checks whether the SEQ of the RST data packet matches the ACK of the SYN_ACK data packet, and if the SEQ of the RST data packet matches the ACK of the SYN_ACK data packet, designates the connection with the server as an authorized connection. In the method, the firewall is required to send the packet to the client only once so as to realize the authentication.

During the implementation of the present invention, the inventor finds that the above-described prior art example has at least the following defects.

The firewall carries out the authentication by checking whether the SEQ of the RST data packet matches the ACK of the SYN_ACK data packet, so that the firewall is required to store the ACK value of the SYN_ACK data packet after sending the SYN_ACK data packet. Once the network becomes abnormal or is under a flood attack, a large number of semi-connections exist in the network, and therefore, the firewall is required to store and maintain a large number of ACK values, thereby occupying storage resources.

SUMMARY OF THE INVENTION

Embodiments of the present invention provide a network authentication method, a method for a client to request authentication, a client, and a device, which are capable of reducing storage resources occupied in the network authentication.

A network authentication method includes:

receiving SYN data sent by a client, where the SYN data includes a sequence number SEQ1 and a network parameter;

sending SYN_ACK data to the client in response to the SYN data, where the SYN_ACK data includes an acknowledgment number ACK2, and the value of ACK2 is a value obtained by carrying out a function transformation according to the network parameter of the SYN data;

receiving RESET (RST) data sent by the client in response to the SYN_ACK data, where the RST data includes a sequence number SEQ3 or an acknowledgment number ACK3, the value of SEQ3 or ACK3 is the same as that of ACK2, and the RST data further includes a network parameter the same as that of the SYN data;

carrying out the function transformation according to the network parameter of the RST data to obtain a check value CHK; and passing the authentication of the client if CHK matches SEQ3 or ACK3.

A network authentication device includes:

a first receiving unit, configured to receive SYN data sent by a client, where the SYN data includes a sequence number SEQ1 and a network parameter;

a sending unit, configured to send SYN_ACK data to the client in response to the SYN data received by the first receiving unit, where the SYN_ACK data includes an acknowledgment number ACK2, and the value of ACK2 is a value obtained by carrying out a function transformation according to the network parameter of the SYN data;

a second receiving unit, configured to receive RST data sent by the client in response to the SYN_ACK data sent by the sending unit, where the RST data includes a sequence number SEQ3 or an acknowledgment number ACK3, and the value of ACK3 is the same as that of SEQ3 or ACK2, and the RST data further includes a network parameter the same as that of the SYN data;

a calculating unit, configured to carry out the function transformation according to the network parameter of the RST data received by the second receiving unit to obtain a check value CHK; and an authenticating unit, configured to pass the authentication of the client when CHK calculated by the calculating unit matches SEQ3 or ACK3 of the RST data.

A method for a client to request authentication includes:

sending SYN data to a gateway, where the SYN data includes a sequence number SEQ1 and a network parameter;

receiving SYN_ACK data sent by the gateway in response to the SYN data, where the SYN_ACK data includes an acknowledgment number ACK2, and the value of ACK2 is a value obtained by carrying out a function transformation according to the network parameter of the SYN data; and if it is judged that the value of ACK2 is different from an expected value, sending RST data to the gateway in response to the SYN_ACK data, where the RST data includes a sequence number SEQ3 or an acknowledgment number ACK3, and the value of SEQ3 or ACK3 is the same as that of ACK2, and the RST data further includes a network parameter the same as that of the SYN data; and instructing the gateway to authenticate the client according to the RST data and SEQ3 or ACK3.

A client includes:

a sending unit, configured to send SYN data to a gateway, where the SYN data includes a sequence number SEQ1 and a network parameter;

a receiving unit, configured to receive SYN_ACK data sent by the gateway in response to the SYN data, where the SYN_ACK data includes an acknowledgment number ACK2, and the value of ACK2 is a value obtained by carrying out a function transformation according to the network parameter of the SYN data;

a judging unit, configured to judge whether the value of ACK2 is the same as an expected value, and if the value of ACK2 is different from the expected value, send RST data to the gateway in response to the SYN_ACK data, where the RST data includes a sequence number SEQ3 or an acknowledgment number ACK3, and the value of SEQ3 or ACK3 is the same as that of ACK2, and the RST data further includes a network parameter the same as that of the SYN data; and instruct the gateway to authenticate the client according to the RST data and SEQ3 or ACK3.

It can be known from the above technical solutions that, with the method, the device, and the client provided in embodiments of the present invention, it is not necessary to store the value of the acknowledgment number of the SYN_ACK data packet at each time of authentication; instead, the value is obtained through the same function calculation during the check, and the authentication is carried out, thereby reducing the occupation of the storage resources. Furthermore, when receiving the SYN_ACK data, the client should judge whether ACK2 of the SYN_ACK data is the same as the expected value, and if they are different, send the RST data to the gateway, so that the gateway can authenticate the client.

BRIEF DESCRIPTION OF THE DRAWINGS

To illustrate the technical solutions according to the embodiments of the present invention more clearly, the accompanying drawings required for describing the embodiments are introduced below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF THE EMBODIMENTS

The technical solutions of the present invention will be clearly described in the following with reference to the accompanying drawings. It is evident that the embodiments to be described are only a part rather than all of the embodiments of the present invention. All other embodiments obtained by persons of ordinary skill in the art based on the embodiments of the present invention without creative efforts should fall within the protection scope of the present invention.

Embodiment 1

Figure 1:
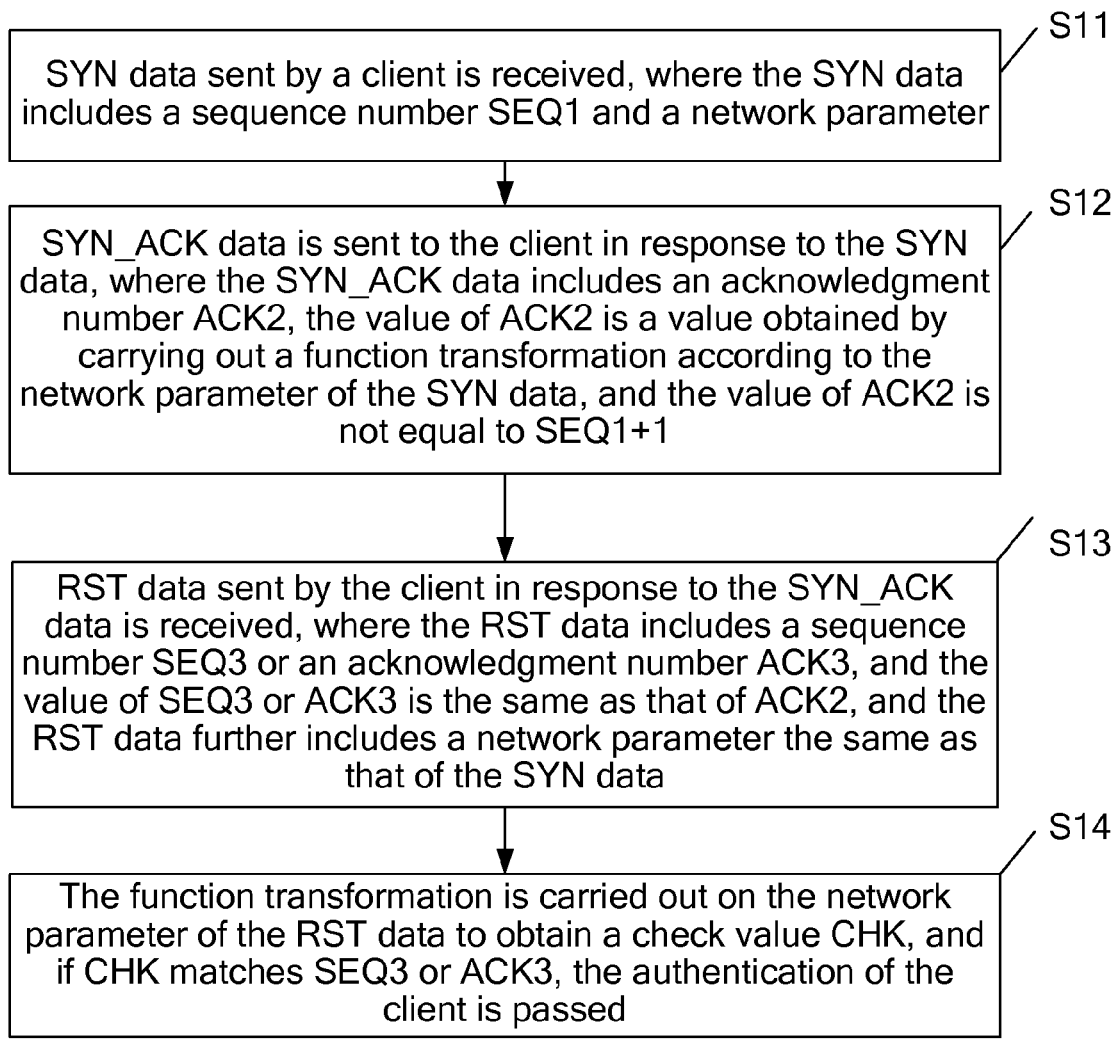
FIG. 1 is a schematic flow chart of a network authentication method according to Embodiment 1 of the present invention.

FIG. 1 is a schematic flow chart of a network authentication method according to Embodiment 1 of the present invention. As shown in FIG. 1, the method includes the following steps.

In step S11, SYN data sent by a client is received, where the SYN data includes a sequence number SEQ1 and a network parameter.

This embodiment takes the TCP/IP protocol as an example, and therefore the data referred to in the present invention is in a format conforming to the specifications of the TCP/IP protocol. The structural content of the header of an IP data packet includes the following information: Version, Type of Service, Total Length, Identification (ID), Flags, Fragment Offset, Time to Live (TTL), Upper-Layer Protocol Type (Protocol), Header Checksum, Source IP Address (SIP), Destination IP Address (DIP), Options, and Padding.

The structure of the header of a TCP data packet includes the following content: Source Port (SPORT), which is the number of the calling port; Destination Port (DPORT), which is the number of the called port; SEQ, which is the number of each TCP data packet sent by a sending end and is increased by 1 in turn with a random initial value; Acknowledgment Number (ACK), which is an expected SEQ of the TCP data packet sent by the opposite end (implying acknowledgment of the received TCP packet); Header Length (HLEN), which is a header length in a unit of 32 bytes; Reserved field, which is set to 0; Code Bits, for controlling segment transmission (for example, establishment and termination of a session) and including six bits of URG, ACK, PSH, RST, SYN, and FIN; Window, which is the number of bytes a receiver can continue to receive; Checksum, which is a checksum including the TCP header and data; Urgent Pointer, which is an offset of the current SEQ to the urgent data position; Option; and Data, which is upper-layer protocol data. In the application layer, the TCP data packet is encapsulated in the IP data packet.

A SYN data packet is the first packet of the TCP connection and is used for initiating a request for the TCP connection. The establishment of the TCP connection requires three handshakes. For example, if A intends to establish a TCP connection with B, A sends a SYN data packet to B, where the SEQ is x; B sends a SYN_ACK data packet to B, where the SEQ is y and the ACK is x+1; and finally, A sends an ACK data packet to B, where the ACK is y+1. In this way, the TCP connection between A and B is established successfully.

In step S12, SYN_ACK data is sent to the client in response to the SYN data, where the SYN_ACK data includes an acknowledgment number ACK2, the value of ACK2 is a value obtained by carrying out a function transformation according to the network parameter of the SYN data, and the value of ACK2 is not equal to SEQ1 plus one.

After receiving the SYN data packet including the sequence number SEQ1 sent by the client, a gateway for protecting the authentication is required to send a SYN_ACK data packet to the client, where the ACK sent at this time is not SEQ1+1, and instead, is an acknowledgment number ACK2 constructed based on a particular function according to the network parameter carried in the SYN data packet sent by the client.

In step S13, RST data sent by the client in response to the SYN_ACK data is received, where the RST data includes a sequence number SEQ3 or an acknowledgment number ACK3, and the value of SEQ3 or ACK3 is the same as that of ACK2, and the RST data further includes a network parameter the same as that of the SYN data.

In step S12, as the value of ACK2 received by the client is different from an expected value, the client sends an RST data packet according to the requirements of the TCP/IP protocol, where the value of the sequence number SEQ3 or the acknowledgment number ACK3 is equal to that of the acknowledgment number ACK2 of the SYN_ACK data packet. Usually, the sequence number SEQ3 and the acknowledgment number ACK3 of the RST data packet may be the same and equal to the value of ACK2; or either SEQ3 or ACK3 is equal to ACK2, and SEQ3 or ACK3 is used for the corresponding authentication.

In step S14, the function transformation is carried out according to the network parameter of the RST data to obtain a check value CHK; specifically, the FUNC function transformation is carried out on the network parameter carried in the RST data packet to obtain the check value CHK; and CHK is compared with SEQ3 or ACK3 to see if they match, and if they match, the authentication of the client is passed.

As the value of the acknowledgment number ACK3 of the RST data packet is the same as that of the acknowledgment number ACK2 of the SYN_ACK data packet, during the authentication, it is only necessary to carry out the same function transformation on the network parameter carried in the return packet, the RST data packet, and to compare the calculated value with the sequence number SEQ3 or the acknowledgment number ACK3 of the RST data packet. If they match, determine that the client sending the SYN data packet is the same as the client sending the RST data packet, and therefore, the authentication is successful; if they do not match, the authentication fails.

The network parameter includes one or more of: a SIP, a SPORT, a DIP, a DPORT, a Protocol, and a TTL in the header structure of the TCP/IP data packet. If the host sending the SYN packet and the host sending the RST packet are the same host, the network parameters carried in the two packets are usually the same. Therefore, during the authentication, the check value CHK obtained by carrying out the same function transformation on the network parameter carried in the RST packet is compared with the sequence number SEQ3 or the acknowledgment number ACK3 of the RST packet (that is, the network parameter carried in the SYN packet is obtained through the same function transformation), and if CHK is equal to the value of SEQ3 or ACK3, the authentication of the client is passed; if the CHK is not equal to the value of SEQ3 or ACK3, the authentication fails.

The above FUNC function transformation may be a hash function or any other function, as long as the variable value of the network parameter after the function transformation is in a one-to-one correspondence with the function value. That is, the function values calculated by using the same network parameter are the same; and the function values calculated by using different network parameters are different. For example, the FUNC function is Func=Hash (SIP, SPORT), which indicates the value obtained by carrying out a hash transformation on the source IP address and the SPORT carried in the data packet.

If the authentication of the client is passed, information such as the IP address of the client may be recorded in a white list. Next time when the client requests connection, the client is allowed to directly access the protected server without being authenticated within the validity period of the record in the white list. For example, the content of the white list may include: the source IP address, the time for creation, the latest time, the TTL, and the valid mark, where the time for creation indicates the time of creating the record of the client; the latest time indicates the time of the last session; the TTL indicates the TTL value recorded in the equipment that the IP data packet actually reaches; and the valid mark indicates whether the record is valid.

In the embodiment of the present invention, when the gateway sends the SYN_ACK data packet to the client, the ACK included in the SYN_ACK data packet is obtained by carrying out a particular function calculation on the network parameter carried in the SYN data packet sent by the client, so that during the check, the same function calculation is carried out on the network parameter carried in the RST data packet returned by the client, and the calculated value is compared with the value of the SEQ in the RST data packet to judge whether the authentication of the client is passed. Therefore, in the method provided by the embodiment of the present invention, it is not necessary to store the value of the SYN_ACK at each time of authentication; instead, the value is obtained through the same function calculation during the check, and the authentication is carried out, thereby reducing the occupation of the storage resources.

Embodiment 2

This embodiment can further prevent an attacker from forging a fake IP address for a flood attack.

If an attacking host forges an IP address of another host, the forged host initiates a request and the attacking host returns an RST packet after receiving a SYN_ACK packet with a wrong SEQ, where the RST packet does not show an obvious difference from the RST packet sent by the forged host, and therefore, it is impossible for the gateway to distinguish whether the host sending the RST packet and the host sending the SYN packet are the same host according to the received RST packet. That is to say, under the circumstances, the network parameters carried in the RST data packet sent by the attacking host or the forged host such as the SIP, the SPORT, the DIP, the DPORT, and the Protocol are the same; the TTL is related to the type of the operating system and the hop count; and if the attacking host and the forged host are in the same Local Area Network (LAN), their hop counts of routing to the gateway are the same, and therefore the TTL value of the data packet sent by the attacking host and that of the data packet sent by the forged host are also the same. In this way, the values obtained by carrying out the function transformation on the above network parameters carried in the RST data packet are the same, and therefore, the gateway cannot identify the fake IP address. For example, if the host sending the SYN packet is the forged host and the host returning the RST packet is the attacking host, the gateway still regards that the authentication is successful, and thereby the attacking host can send a large number of data packets considered normal by the gateway to attack the server.

In order to enable the gateway to identify the fake IP address, the difference between this embodiment and Embodiment 1 lies in that, in this embodiment, the network parameters used for carrying out the function transformation include the ID in the header of the IP data packet. The ID field indicates the sequence of the IP data packet in the packets sent by the same host system, where 1 is added automatically to the ID each time a data packet is sent, and therefore, the IDs of the packets sent by two different hosts at the same time cannot be the same or close to each other. That is to say, if the SYN data packet and the RST data packet received by the gateway within a certain time are sent by the same host, the ID values should not vary greatly; and if they are sent by different hosts, the ID values vary greatly. The gateway can use this characteristic to identify the fake IP address. Specifically, during the function transformation described in Embodiment 1, the network parameters including the ID value after the function transformation are taken as the ACK of the SYN_ACK packet; and during the authentication, the same function transformation is carried out on the same network parameters. The comparing whether CHK matches ACK3 may specifically be comparing whether CHK and ACK3 are in a set range, and if CHK and ACK3 are in a set range, the authentication is successful; if CHK and ACK3 are not in a set range, the authentication fails.

Embodiment 3

Figure 2:
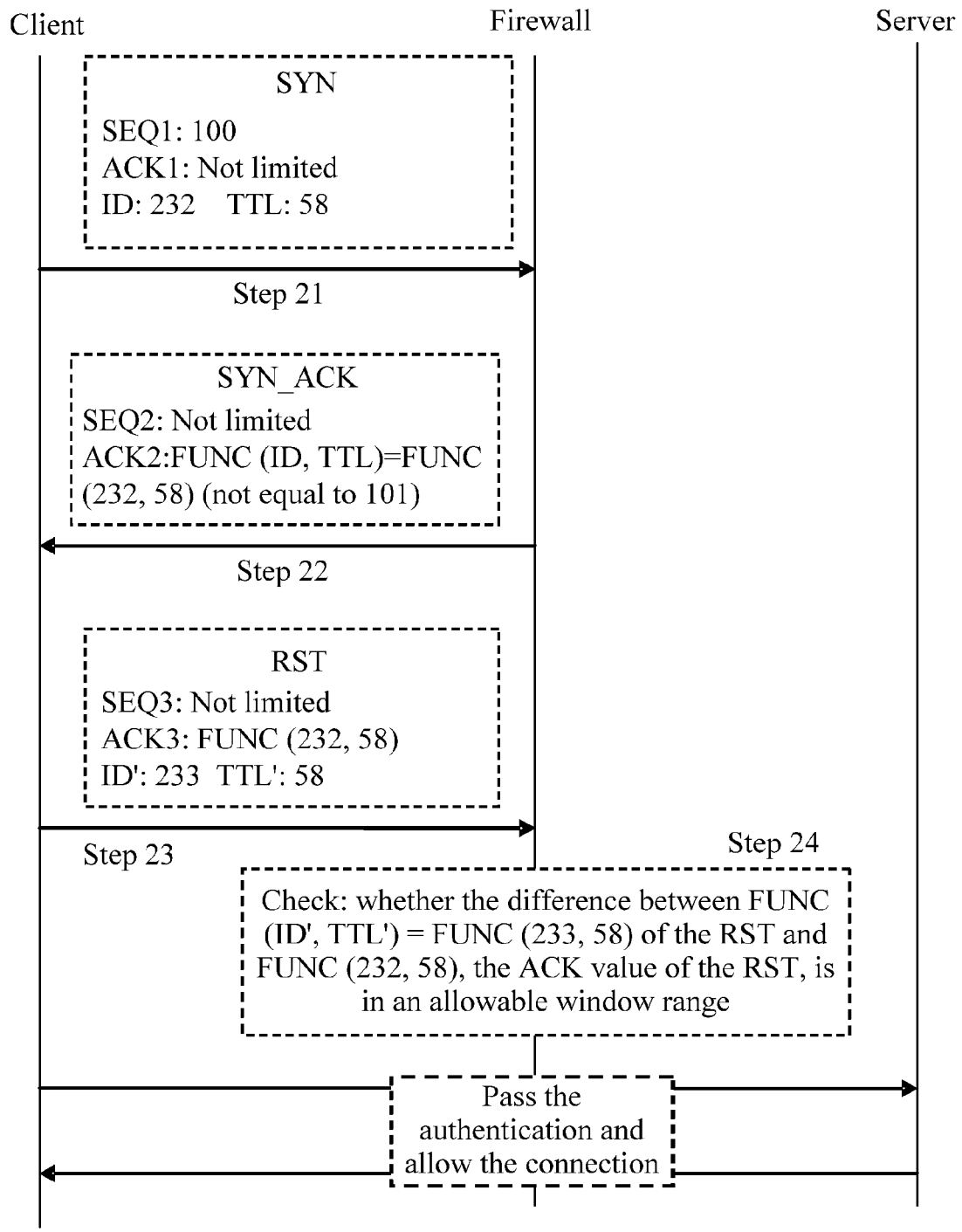
FIG. 2 is a schematic flow chart of a network authentication method according to Embodiment 3 of the present invention.

FIG. 2 is a schematic flow chart of a network authentication method according to Embodiment 3 of the present invention. As shown in FIG. 2, an application example is described in this embodiment, where a server is protected by a firewall.

In step 21, a client sends a SYN data packet to a gateway to request establishing a connection with a server, where the server is protected by a firewall; SEQ1 of the SYN data packet arriving at the firewall is 100, the ID value is 232, and the TTL value is 58.

In step 22, the firewall sends a SYN_ACK data packet to the client in response to the SYN data packet, where the value of the acknowledgment number ACK2 of the SYN_ACK data packet is equal to FUNC (ID, TTL)=FUNC (232, 58) and is not equal to (SEQ1+1), that is, not equal to 101.

In step 23, the client sends an RST data packet to the firewall after receiving the SYN_ACK data packet including the wrong acknowledgment number ACK2, where the value of the acknowledgment number ACK3 of the RST data packet is consistent with the value of the ACK of the SYN_ACK data packet sent by the firewall, that is, FUNC(232, 58); SEQ3 is not limited, and may be FUNC (232, 58) or any other value selected by the client; the value of the identification ID' of the RST data packet is 233, and the value of the time to live TTL' is 58.

In step 24, the firewall is required to check the identity of the client after receiving the RST data packet, and compare whether the value of the acknowledgment number ACK3 carried in the RST data packet matches the value after the function transformation according to the identification ID' and the time to live TTL' carried in the RST data packet, that is, compare whether the difference between FUNC(232, 58) and FUNC (233, 58) is in an allowable window range; and if the difference between FUNC (232, 58) and FUNC (233, 58) is in an allowable window range, pass the authentication of the client and allow the client to directly communicate with the server.

The above function is calculated only with two variables, the ID and the TTL. It is also possible to comprehensively consider a plurality of variables to construct a FUNC function, for example, the function may be assumed as follows:

FUNC(TTL,ID,SIP,SPORT,DIP,DPORT,
    PROTOCOL)=(x*TTL+y*ID+z*HASH(SIP,
    SPORT,DIP,DPORT,PORTOCOL))Mod M, where x, y, z are three constant parameters; Mod indicates modulus operation; M indicates modulus 65536; HASH indicates a hash function; and meanings of other symbols are the same as those in the previous description.

As for the ACK of the SYN_ACK packet and the ACK of the RST packet, the hash results thereof are the same. However, as for a real host, the ID values are different. Usually the difference of the ID values is 1 or a very small value. Therefore, the values calculated by the FUNC function transformation on the network parameters carried in the SYN_ACK packet and the RST packet are in the corresponding window range. For example, the x, y and z are respectively supposed as 1, 1, and 1, and the difference is not greater than 10, and then the window can be supposed as 10.

As for the request initiated by forging the real host, although the hash results are the same, the TTLs and IDs of the real host and the forged host are usually different, since the IDs of the packets sent by two different hosts at the same time cannot be the same or close to each other. The TTL value is related to the version of an operating system and a hop count of routing. It is difficult to suppose that the TTL of the real host to the gateway is consistent with the TTL of the attacking host to the gateway. Therefore, the two calculated FUNC values are hard to be the same, so as to realize the authentication.

It is apparent to persons of ordinary skill in the art that all or part of the steps of the method in the above embodiments can be accomplished by related hardware under the instruction of a computer program. The program can be stored in a computer readable storage medium. When the program is run, the steps of the method described in the embodiments of the present invention are performed. The storage medium can be a magnetic disk, an optical disk, a Read-Only Memory (ROM), or a Random Access Memory (RAM).

Embodiment 4

Network Authentication Device

Figure 3:
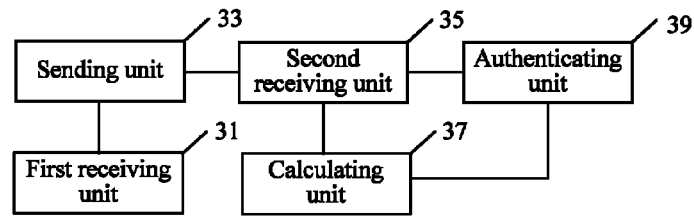
FIG. 3 is a schematic structural view of a network authentication device according to an embodiment of the present invention.

FIG. 3 is a schematic structural view of a network authentication device according to an embodiment of the present invention. As shown in FIG. 3, the network authentication device includes a first receiving unit 31, a sending unit 33, a second receiving unit 35, a calculating unit 37, and an authenticating unit 39.

The first receiving unit 31 is configured to receive SYN data sent by a client, where the SYN data includes a sequence number SEQ1 and a network parameter.

The sending unit 33 is configured to send SYN_ACK data to the client in response to the SYN data received by the first receiving unit 31, where the SYN_ACK data includes an acknowledgment number ACK2, the value of ACK2 is a value obtained by carrying out a function transformation according to the network parameter of the SYN data; and the value of ACK2 is not equal to SEQ1+1.

The second receiving unit 35 is configured to receive RST data sent by the client in response to the SYN_ACK data sent by the sending unit 33, where the RST data includes a sequence number SEQ3 or an acknowledgment number ACK3, and the value of SEQ3 or ACK3 is the same as that of ACK2, and the RST data further includes a network parameter the same as that of the SYN data.

The calculating unit 37 is configured to carry out the function transformation according to the network parameter of the RST data received by the second receiving unit 35 to obtain a check value CHK.

The authenticating unit 39 is configured to pass the authentication of the client when CHK calculated by the calculating unit 37 matches SEQ3 or ACK3 of the RST data.

If the network parameter includes one or more of: a SIP, a SPORT, a DIP, a DPORT, a Protocol, and a TTL in an IP header of a data packet, the authenticating unit 39 is configured to pass the authentication of the client when CHK calculated by the calculating unit 37 is equal to SEQ3 or ACK3 of the RST data; specifically, the authenticating unit 39 is configured to compare whether CHK is equal to the value of SEQ3 or ACK3, and if CHK is equal to the value of SEQ3 or ACK3, pass the authentication of the client. If the network parameter includes an ID, the authenticating unit 39 is configured to pass the authentication of the client when a difference between CHK calculated by the calculating unit 37 and SEQ3 or ACK3 of the RST data is in a preset range; specifically, the authenticating unit 39 is configured to compare whether a difference between CHK and SEQ3 or ACK3 is in a set range, and if a difference between CHK and SEQ3 or ACK3 is in a set range, pass the authentication of the client.

Embodiment 5

Figure 4:
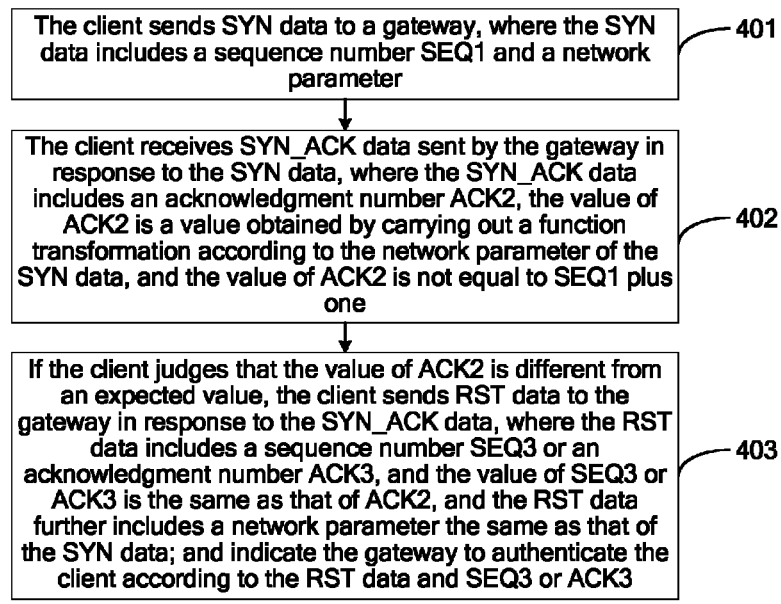
FIG. 4 is a flow chart of a method for a client to request authentication according to an embodiment of the present invention.

An embodiment of the present invention further provides a method for a client to request authentication. FIG. 4 is a schematic structural view of the method. Referring to FIG. 4, the method includes the following steps.

In step 401, the client sends SYN data to a gateway, where the SYN data includes a sequence number SEQ1 and a network parameter.

In step 402, the client receives SYN_ACK data sent by the gateway in response to the SYN data, where the SYN_ACK data includes an acknowledgment number ACK2, the value of ACK2 is a value obtained by carrying out a function transformation according to the network parameter of the SYN data, and the value of ACK2 is not equal to SEQ1 plus one.

In step 403, if the client judges that the value of ACK2 is different from an expected value, the client sends RST data to the gateway in response to the SYN_ACK data, where the RST data includes a sequence number SEQ3 or an acknowledgment number ACK3, and the value of SEQ3 or ACK3 is the same as that of ACK2, and the RST data further includes a network parameter the same as that of the SYN data; and instruct the gateway to authenticate the client according to the RST data, and SEQ3 or ACK3.

That is to say, after receiving the RST data sent by the client, the gateway authenticates the client according to the network parameter data and SEQ3 or ACK3 in the RST data, that is, the gateway carries out the function transformation according to the network parameter of the RST data to obtain a check value CHK, and if CHK matches the value of SEQ3 or ACK3, passes the authentication of the client.

The matching the value of SEQ3 or ACK3 by CHK specifically includes: if CHK is equal to SEQ3 or ACK3, passing the authentication of the client; or, if a difference between CHK and SEQ3 or ACK3 is in a set range, passing the authentication of the client.

Preferably, the network parameter includes one or more of: a SIP, a SPORT, a DIP, a DPORT, a Protocol, and a TTL in an IP header of a data packet.

Preferably, the network parameter includes an ID in an IP header of a data packet.

Preferably, the function is a hash function.

Figure 5:
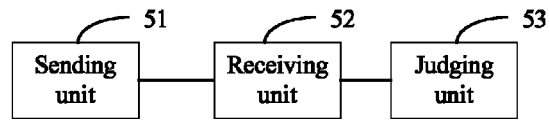
FIG. 5 is a schematic structural view of a client according to an embodiment of the present invention.

Based on the implementation of the above method, the embodiment of the present invention further provides a client. FIG. 5 is a schematic structural view of the client. Referring to FIG. 5, the client includes a sending unit 51, a receiving unit 52 and a judging unit 53. The sending unit 51 is configured to send SYN data to a gateway, where the SYN data includes a sequence number SEQ1 and a network parameter. The receiving unit 52 is configured to receive SYN_ACK data sent by the gateway in response to the SYN data after the sending unit 51 sends the SYN data to the gateway, where the SYN_ACK data includes an acknowledgment number ACK2, the value of ACK2 is a value obtained by carrying out a function transformation according to the network parameter of the SYN data, and the value of ACK2 is not equal to SEQ1 plus one. The judging unit 53 is configured to judge whether the value of ACK2 is equal to an expected value, and if the value of ACK2 is different from the expected value, send RST data to the gateway in response to the SYN_ACK data, where the RST data includes a sequence number SEQ3 or an acknowledgment number ACK3, the value of SEQ3 or ACK3 is the same as that of ACK2, and the RST data further includes a network parameter the same as that of the SYN data; and instruct the gateway to authenticate the client according to the RST data and SEQ3 or ACK3.

The implementation of the units in the client can be seen in the corresponding implementation of the above method, and therefore, will not be described herein again.

The network authentication device provided by embodiments of the present invention can be configured to implement the network authentication method provided by Embodiments 1 to 3. When the network authentication device sends the SYN_ACK data packet to the client, the ACK included in the SYN_ACK data packet is obtained by carrying out a particular function calculation on the network parameter carried in the SYN data packet sent by the client, so that during the check, the same function calculation is carried out on the network parameter carried in the RST data packet returned by the client, and the calculated value is compared with the value of the ACK or the SEQ in the RST data packet to judge whether the authentication of the client is passed. Therefore, in the network authentication device provided by the embodiment of the present invention, it is not necessary to store the ACK value of the SYN_ACK data packet at each time of authentication; instead, the value is obtained through calculation during the check, and the authentication is carried out, thereby reducing the occupation of the storage resources.

It is apparent to persons of ordinary skill in the art that all or part of the steps of the method in the above embodiment can be accomplished by related hardware under the instruction of a computer program. The program can be stored in a computer readable storage medium. When the program is run, the steps of the method described in the embodiment of the present invention are performed. The storage medium can be a magnetic disk, an optical disk, a ROM, or a RAM.

The network authentication device provided by the embodiment of the present invention generally refers to a software or hardware entity for enhancing the security protection, configured to protect a server or a private network from an illegal connection or a malicious attack of an unauthorized user, which may be part or all of a firewall, a gateway, or a router in the actual product; or the network authentication device may be used as part of a client to protect the client from the attack.

In a word, the above description is only exemplary embodiments of the present invention, and is not intended to limit the protection scope of the present invention. Any modifications, equivalent replacements, and improvements made without departing from the principle of the present invention should fall within the protection scope of the present invention.

What is claimed is:

1. A network authentication method, comprising:
   receiving synchronize (SYN) data sent by a client, wherein the SYN data comprises a sequence number SEQ1 and a network parameter;
   sending synchronize acknowledge (SYN_ACK) data to the client in response to the SYN data, wherein the SYN_ACK data comprises an acknowledgment number ACK2, and a value of ACK2 is the value obtained by carrying out a function transformation according to the network parameter of the SYN data;
   receiving RESET (RST) data sent by the client in response to the SYN_ACK data, wherein the RST data comprises a sequence number SEQ3 or an acknowledgment number ACK3, a value of SEQ3 or ACK3 is the same as that of ACK2, and the RST data further comprises a network parameter the same as that of the SYN data;
   carrying out the function transformation according to the network parameter of the RST data to obtain a check value CHK; and
   passing the authentication of the client if CHK matches the value of SEQ3 or ACK3;
   wherein the network parameter comprises one or more of an Identification (ID), a Source Internet Protocol Address (SIP), a Source Port (SPORT), a Destination IP Address (DIP), a Destination Port (DPORT) a Protocol Type (Protocol), and a Time to Live (TTL) in an IP header of a data packet;
   wherein the function transformation is constructed as $$\text{FUNC}(TTL, ID, SIP, SPORT, DIP, DPORT, PROTOCOL) = (x*TTL + y*ID + z*HASH(SIP, SPORT, DIP, DPORT, PROTOCOL)) \text{Mod } M,$$

where x, y z are three constant parameters; Mod indicates modulus operation; M indicates modulus 65536; HASH indicates a hash function.

2. The method according to claim 1, wherein the passing the authentication of the client if CHK matches the value of SEQ3 or ACK3 comprises:
   passing the authentication of the client if CHK is equal to SEQ3 or ACK3.

3. The method according to claim 1, wherein the passing the authentication of the client if CHK matches the value of SEQ3 or ACK3 comprises:
   passing the authentication of the client if a difference between CHK and SEQ3 or ACK3 is in a set range.

4. A network server including a non-transitory computer readable medium including computer-executable instructions for carrying out a network authentication device, the network authentication device comprising:
   a first receiving unit, configured to receive synchronize (SYN) data sent by a client, wherein the SYN data comprises a sequence number SEQ 1 and a network parameter;
   a sending unit, configured to send synchronize acknowledge (SYN_ACK) data to the client in response to the SYN data received by the first receiving unit, wherein the SYN_ACK data comprises an acknowledgment number ACK2, and a value of ACK2 is the value obtained by carrying out a function transformation according to the network parameter of the SYN data;
   a second receiving unit, configured to receive RESET (RST) data sent by the client in response to the SYN_ACK data sent by the sending unit, wherein the RST data comprises a sequence number SEQ3 or an acknowledgment number ACK3, and a value of ACK3 is the same as that of SEQ3 or ACK2, and the RST data further comprises a network parameter the same as that of the SYN data;
   a calculating unit, configured to carry out the function transformation according to the network parameter of the RST data received by the second receiving unit to obtain a check value CHK; and
   an authenticating unit, configured to pass the authentication of the client when CHK calculated by the calculating unit matches SEQ3 or ACK3 of the RST data;
   wherein the network parameter comprises one or more of an Identification (ID), a Source Internet Protocol Address (SIP), a Source Port (SPORT), a Destination IP Address (DIPL a Destination Port (DPORT) a Protocol Type (Protocol) and a Time to Live (TTL) in an IP header of a data packet;
   wherein the function transformation is constructed as $$\text{FUNC}(TTL, ID, SIP, SPORT, DIP, DPORT, PROTOCOL) = (x*TTL + y*ID + z*HASH(SIP, SPORT, DIP, DPORT, PROTOCOL)) \text{Mod } M,$$

where x, y, z are three constant parameters; Mod indicates modulus operation; M indicates modulus 65536; HASH indicates a hash function.

5. The device according to claim 4, wherein the authenticating unit is specifically configured to pass the authentication of the client when CHK calculated by the calculating unit is equal to SEQ3 or ACK3 of the RST data.

6. The device according to claim 4, wherein the authenticating unit is specifically configured to pass the authentication of the client when a difference between CHK calculated by the calculating unit and SEQ3 or ACK3 of the RST data is in a preset range.

7. A network client including a non-transitory computer readable medium including computer-executable instructions for carrying out a set of functional components, the functional components comprising:
   a sending unit, configured to send synchronize (SYN) data to a gateway, wherein the SYN data comprises a sequence number SEQ1 and a network parameter;
   a receiving unit, configured to receive synchronize acknowledge (SYN_ACK) data sent by the gateway in response to the SYN data, wherein the SYN_ACK data comprises an acknowledgment number ACK2, and a value of ACK2 is the value obtained by carrying out a function transformation according to the network parameter of the SYN data; and
   a judging unit, configured to judge whether the value of ACK2 is the same as an expected value, and if the value of ACK2 is different from the expected value, send RESET (RST) data to the gateway in response to the SYN_ACK data, wherein the RST data comprises a sequence number SEQ3 or an acknowledgment number ACK3, a value of SEQ3 or ACK3 is the same as that of ACK2, and the RST data further comprises a network parameter the same as that of the SYN data; and instruct the gateway to authenticate the client according to the RST data and SEQ3 or ACK3;
wherein the network parameter comprises one or more of an Identification (ID), a Source Internet Protocol Address (SIP), a Source Port (SPORT), a Destination IP Address (DIP), a Destination Port (DPORT), a Protocol Type (Protocol), and a Time to Live (TTL) in an IP header of a data packet;
wherein the function transformation is constructed as $$\text{FUNC}(TTL, ID, SIP, SPORT, DIP, DPORT, PROTOCOL) = (x*TTL + y*ID + z*\text{HASH}(SIP, SPORT, DIP, DPORT, PROTOCOL)) \bmod M,$$

where x, y, z are three constant parameters; Mod indicates modulus operation; M indicates modulus 65536; HASH indicates a hash function.

* * * * *

UNITED STATES PATENT AND TRADEMARK OFFICE
CERTIFICATE OF CORRECTION

PATENT NO. : 8,453,208 B2  
APPLICATION NO. : 13/095413  
DATED : May 28, 2013  
INVENTOR(S) : Wu Jiang Page 1 of 1

It is certified that error appears in the above-identified patent and that said Letters Patent is hereby corrected as shown below:

In the Claims:

Column 12, line 6, "x, y z" should read -- x, y, z --.

Column 12, line 52, "(DIPL" should read -- (DIP) --.

Signed and Sealed this  
Thirteenth Day of August, 2013

Teresa Stanek Rea  
*Acting Director of the United States Patent and Trademark Office*